Patented Aug. 20, 1946

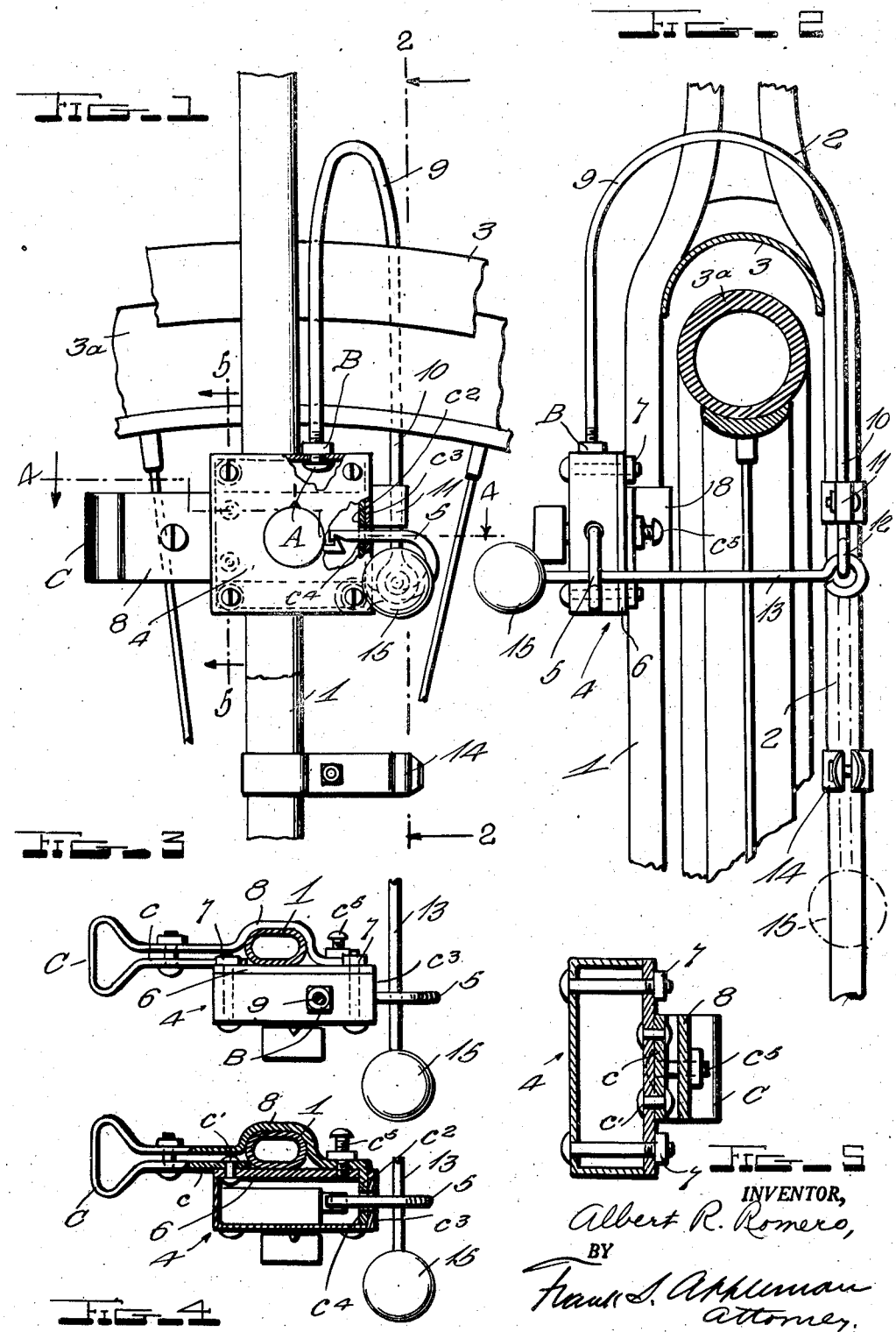

2,406,257

UNITED STATES PATENT OFFICE 2,406,257

PERMANENT SAFETY LOCK DEVICE FOR BICYCLES AND THE LIKE

Albert R. Romero, Tucson, Ariz.

Application December 20, 1944, Serial No. 569,000

1 Claim. (Cl. 70—227)

This invention relates to locks for bicycles, motorcycles or the like, installed as a permanent part of the equipment of such transportation units; it being an object to provide a lock, preferably of the permutation type, rigidly attached to a member of the bicycle or motorcycle which, for the purpose of simplicity of description, will be hereinafter referred to as a "bicycle"; the said lock, in the present embodiment of the invention, being attached to a fork stem of said bicycle; the said lock having associated with it, novel means which are introduced between spokes of a wheel of the bicycle and retained in a position transversely of the wheel through means of the lock, the said transversely disposed member being articulated with respect to another permanently mounted element of the equipment.

A further object of this invention is to provide novel means for mounting the lock on the frame or fork of the bicycle, and other means for holding the associated parts inactive during travel, yet permitting ready adjustment of the locking means when the bicycle has come to rest; and it is furthermore an object to provide an installation of the character indicated which has proven efficient and satisfactory, as well as comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in side elevation of a fragment of the rear fork and mud guard of a bicycle, with a device embodying the invention mounted thereon, the wheels of the bicycle being omitted;

Figure 2 illustrates a sectional view on the line 2—2 of Fig. 1;

Figure 3 illustrates a section of the fork with the lock and its mounting in plan;

Figure 4 illustrates a sectional view on the line 4—4 of Fig. 1; and

Figure 5 illustrates a sectional view on the line 5—5 of Fig. 1.

In the drawing 1 and 2 denote the forks of a bicycle frame and 3 the usual mud guard, which may be of any convenient structure, it being understood that a wheel $3^a$ of the bicycle operates between the two forks.

A lock 4 of the permutation type has a hasp 5 which is held closed or released, according to the structural features of the lock mechanism which, it is thought, need not be described in detail, since any appropriate locking mechanism may be employed. The lock casing has a plate 6 attached to it, as at 7, and the lock is held stationary on the fork 1 by a clip 8 which is in such relation to the lock that when the lock is functioning, the said lock can not be dislodged from the fork. The clip 8 comprises a strip of metal doubled on itself to form a loop C, and one length $c$ of the clip is attached to the plate 6 of the lock by fastenings such as rivets $c'$. The length of material of the clip on the other side of the loop is shaped to partially embrace the fork 1 and has its end $c^2$ bent at an angle so that it projects through a space in the lock casing, which space is back of the end plate $c^3$ of the lock casing, and the said end of the clip within the lock casing has an aperture $c^4$ which alines with an aperture in the lock casing through which the hasp of the lock projects. Hence, when the lock is functioning, the hasp prevents the clip from being removed from the lock and additionally, the clip is held on the lock casing by fastenings such as screws $c^5$ with appropriate retaining means as illustrated in Fig. 4.

A yoke 9 has its end extending through the lock casing and anchored therein by having its end upset within the casing, as shown at A. The yoke is threaded above the upset portion and a lock nut B is threaded thereon to engage the casing of the lock to hold the parts assembled. The yoke may be turned or partially rotated in the lock casing or, in other words, may be swung to an appropriate position for shipment, and the yoke may be made of flexible steel cable or B—X. The said yoke arches over the mud guard and has a leg 10 secured by a clip 11 to a fork 2, so that by this means, the yoke is rigidly attached to the bicycle structure. The end of the leg 10 is provided with a hook 12 by which a link 13 is swingingly or oscillatably attached to it; it being understood that the connection of the link with the leg is on the upper end of the link when it is in the position shown in dotted lines, Fig. 2. The joints between the end of the hook and the looped end of the link are closed by soldering so that they can be readily detached or, if desirable, these members may be connected by a universal joint. As shown in Figure 1, the link is engaged by a spring clip 14 in which it is held by friction and may be readily dislodged therefrom by pulling it outward with respect to the clip. The link is shown as having a knob or enlargement 15 on its end, which will not escape through the loop of the hasp when it has been locked in the hasp as it is shown in Figure 2; it being understood that when the bicycle is to be locked, the link is extended transversely between the spokes of the wheel and secured in place by adjusting the lock to its locking position, so that by this means, a stationary locking instrumentality is installed on bicycles, or the like, now in common use.

I claim:

A lock construction for locking a wheel of a bicycle relative to a fork-like frame in which the wheel is mounted, comprising means for attaching the lock to the frame comprising a length of material doubled on itself to form a loop, means for attaching the material on one side of the loop to the lock, the length of material on the opposite side of the loop being shaped to embrace one leg of the frame and having an angularly disposed end coacting with the lock and having means for receiving a hasp of the lock when in locking position whereby the removal of the lock is prevented, a yoke attached to the lock and having a part projecting downwardly along the other leg of the frame, means for attaching the part to the other leg of the frame, a joint on the end of said leg, a link having a joint member coacting with the first mentioned joint, said link being adapted to assume an approximately horizontal position through a space between spokes of the wheel and to be lodged in the hasp of the lock, and a spring clip attached to a permanent part of the bicycle for engaging the link and holding it inoperative.

ALBERT R. ROMERO.